(12) United States Patent
Despotuli

(10) Patent No.: US 10,274,077 B2
(45) Date of Patent: Apr. 30, 2019

(54) SYSTEM AND METHOD FOR CONTROLLING A VEHICLE

(71) Applicant: Leonid Despotuli, Chernogolovka (RU)

(72) Inventor: Leonid Despotuli, Chernogolovka (RU)

(*) Notice: Subject to any disclaimer, the term of this patent is extended or adjusted under 35 U.S.C. 154(b) by 521 days.

(21) Appl. No.: 14/838,552

(22) Filed: Aug. 28, 2015

(65) Prior Publication Data

US 2016/0223074 A1 Aug. 4, 2016

Related U.S. Application Data

(63) Continuation-in-part of application No. 14/337,177, filed on Jul. 21, 2014, now Pat. No. 9,643,489, which is a continuation-in-part of application No. 13/792,176, filed on Mar. 10, 2013, now Pat. No. 9,080,662.

(51) Int. Cl.
| | |
|---|---|
| *F16H 59/06* | (2006.01) |
| *F16H 59/04* | (2006.01) |
| *B60K 20/04* | (2006.01) |
| *B60K 23/08* | (2006.01) |
| *B60K 26/02* | (2006.01) |
| *F16H 59/02* | (2006.01) |

(52) U.S. Cl.
CPC .......... *F16H 59/0204* (2013.01); *B60K 20/04* (2013.01); *B60K 23/08* (2013.01); *B60K 26/02* (2013.01); *F16H 59/04* (2013.01); *F16H 59/06* (2013.01); *B60K 2023/0883* (2013.01); *B60K 2023/0891* (2013.01); *F16H 2059/0221* (2013.01); *F16H 2059/0234* (2013.01)

(58) Field of Classification Search
None
See application file for complete search history.

(56) References Cited

U.S. PATENT DOCUMENTS

| | | | |
|---|---|---|---|
| 6,551,212 B2* | 4/2003 | Skinner | B60W 10/06 192/220.1 |
| 2012/0210820 A1* | 8/2012 | Elshorbagy | B60T 7/06 74/513 |

* cited by examiner

*Primary Examiner* — Colby M Hansen
(74) *Attorney, Agent, or Firm* — TransPacific Law Group; Pavel I. Pogodin, Esq.

(57) ABSTRACT

In accordance with one aspect of the techniques described herein, there is provided a vehicle comprising an engine, an automatic, robotic, or continuously variable transmission mechanically coupled to the engine, a four-wheel drive system, a vehicle control system coupled to the engine, the four-wheel drive system and the transmission, a breaking system, a gas pedal for controlling the operation of the engine, a break pedal for controlling the operation of the breaking system, the gas pedal and the break pedal being disposed in the vehicle for control by a right foot of the driver, the vehicle further comprising an additional pedal being disposed in the vehicle for control by a left foot of the driver and coupled to the vehicle control system, wherein the additional pedal is separate and distinct from the break pedal and the gas pedal and wherein additional pedal controls the four-wheel drive system of the vehicle.

19 Claims, 1 Drawing Sheet

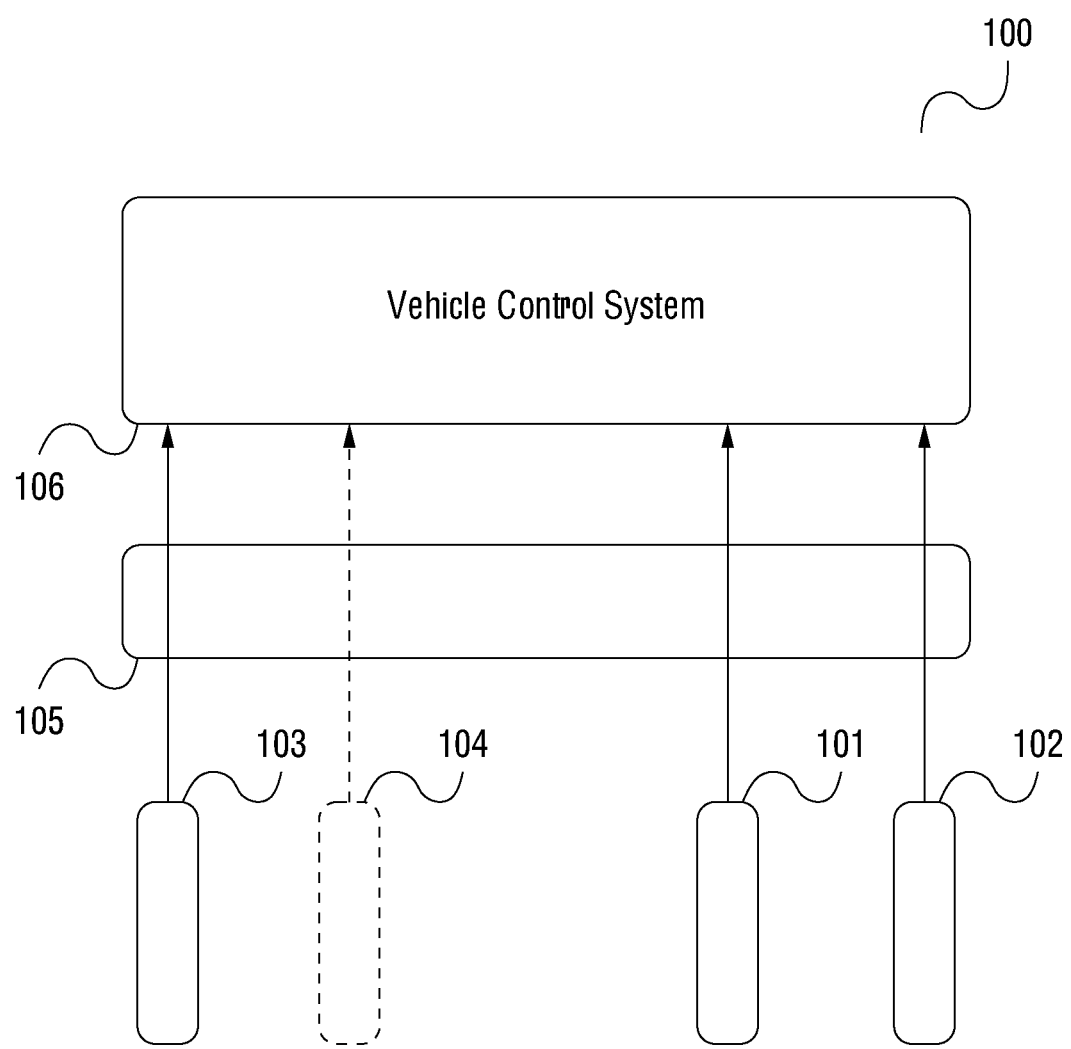

SYSTEM AND METHOD FOR CONTROLLING A VEHICLE

CROSS-REFERENCE TO RELATED PATENT APPLICATION

The present patent application relies upon, claims the benefit of priority from, and is a continuation-in-part of U.S. patent application Ser. No. 14/377,177 filed on Jul. 21, 2014, which claims the benefit of priority from, and is a continuation-in-part of U.S. patent application Ser. No. 13/792,176 filed on Mar. 10, 2013, the entire disclosure of both of which is incorporated by reference herein.

BACKGROUND OF THE INVENTION

Technical Field

The described techniques relate to automotive technology and, more specifically, to a system and method for controlling a vehicle using certain additional foot pedal(s) and/or other control(s).

Description of the Related Art

In accordance with conventional automotive technology, vehicles with automatic or robotic transmission or with continuously variable transmission (CVT or variator) use only two pedals controlled with the right foot of the vehicle driver—the gas and brake pedals. Some vehicles are equipped with additional controls in the form of buttons located on the steering wheel or dashboard, steering column switches, or automatic transmission levers. However, the use of these additional control means requires the drive to use his or her hands and, consequently, causes driver distraction. On the other hand, according to the conventional automotive technology, the left foot of the driver of a vehicle with an automatic or robotic transmission is not used for controlling the vehicle.

Therefore, new systems and methods for controlling a vehicle, including its engine and transmission, that provide an increased convenience for the driver are needed.

SUMMARY OF THE INVENTION

The inventive methodology is directed to methods and systems that substantially obviate one or more of the above and other problems associated with conventional techniques for controlling a vehicle.

In accordance with one aspect of the techniques described herein, there is provided a vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the vehicle further comprising an additional pedal being disposed in the vehicle for control by a left foot of the driver and coupled to the vehicle control system, wherein the additional pedal is separate and distinct from the brake pedal and the gas pedal and wherein the additional pedal is configured to control the gear shifting of the automatic, robotic, or continuously variable transmission of the vehicle separately and distinctly from the control of the automatic, robotic, or continuously variable transmission by means of the handle or other hand-manipulated main control of the automatic, robotic, or continuously variable transmission.

In one or more embodiments, upon an activation of the additional pedal, the automatic, robotic, or continuously variable transmission of the vehicle is configured to downshift.

In one or more embodiments, upon a release of the additional pedal, the automatic, robotic, or continuously variable transmission of the vehicle is configured to upshift.

In one or more embodiments, upon a release of the additional pedal, the automatic, robotic, or continuously variable transmission of the vehicle is configured to return to a previous gear.

In one or more embodiments, upon an activation of the additional pedal, the automatic, robotic, or continuously variable transmission of the vehicle is configured to upshift.

In one or more embodiments, the additional pedal is configured to control the gear shifting mode of the automatic, robotic, or continuously variable transmission of the vehicle.

In one or more embodiments, upon an activation of the additional pedal, the automatic, robotic, or continuously variable transmission of the vehicle is configured to enter sport shifting mode.

In one or more embodiments, upon a subsequent activation of the additional pedal, the automatic, robotic, or continuously variable transmission of the vehicle is configured to enter a normal shifting mode.

In one or more embodiments, the additional pedal is configured to control an operating mode of the engine of the vehicle.

In one or more embodiments, the vehicle further includes a second additional pedal coupled to the vehicle control system, the wherein upon an activation of the additional pedal, the automatic, robotic, or continuously variable transmission of the vehicle is configured to downshift and upon an activation of the second additional pedal, the automatic, robotic, or continuously variable transmission of the vehicle is configured to upshift.

In accordance with another aspect of the techniques described herein, there is provided a method for controlling a vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the method comprising: providing an additional pedal being disposed in the vehicle for control by a left foot of the driver and coupled to the vehicle control system and controlling the vehicle using the additional pedal, wherein the additional pedal is separate and distinct from the brake pedal and the gas pedal and wherein the additional pedal is configured to control the gear shifting of the automatic, robotic, or continuously variable transmission of the vehicle separately and distinctly from the control of the automatic, robotic, or continuously variable transmission by means of the handle or other hand-manipulated main control of the automatic, robotic, or continuously variable transmission.

In one or more embodiments, upon an activation of the additional pedal, the automatic, robotic, or continuously variable transmission of the vehicle is configured to downshift.

In one or more embodiments, upon a release of the additional pedal, the automatic, robotic, or continuously variable transmission of the vehicle is configured to upshift.

In one or more embodiments, upon a release of the additional pedal, the automatic, robotic, or continuously variable transmission of the vehicle is configured to return to a previous gear.

In one or more embodiments, upon an activation of the additional pedal, the automatic, robotic, or continuously variable transmission of the vehicle is configured to upshift.

In one or more embodiments, the additional pedal is configured to control the gear shifting mode of the automatic, robotic, or continuously variable transmission of the vehicle.

In one or more embodiments, upon an activation of the additional pedal, the automatic, robotic, or continuously variable transmission of the vehicle is configured to enter sport shifting mode.

In one or more embodiments, upon a subsequent activation of the additional pedal, the automatic, robotic, or continuously variable transmission of the vehicle is configured to enter a normal shifting mode.

In one or more embodiments, the additional pedal is configured to control an operating mode of the engine of the vehicle.

In accordance with yet another aspect of the techniques described herein, there is provided a vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the vehicle further comprising an additional control mechanism being disposed in the vehicle for control by a left foot of the driver and coupled to the vehicle control system, wherein the additional control mechanism is separate and distinct from the brake pedal and the gas pedal.

In one or more embodiments, the additional control mechanism is configured to control a cruise control module of the vehicle control system.

In one or more embodiments, the additional control mechanism is configured to additionally control the gear shifting of the automatic, robotic, or continuously variable transmission of the vehicle.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary embodiment of the inventive control mechanism configured to enable the driver to control one or more systems of the vehicle including, without limitation, the engine, transmission or CVT without causing driver distraction.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Various embodiments of the invention relate to a systems and methods for controlling one or more systems or components of a vehicle. Specifically, in accordance with one or more embodiments of the invention, there is provided a vehicle with an automatic or robotic transmission or a continuously variable transmission (CVT or variator) incorporating a novel control mechanism configured to enable the driver to control one or more systems of the vehicle including, without limitation, the engine, transmission or CVT without causing driver distraction.

As would be appreciated by persons of skill in the art, the left foot of the driver in such vehicles is not used during the driving. On the other hand, controlling vehicle systems using driver's hands is distractive for the driver. Thus, it is desirable to utilize driver's unused left foot for vehicle systems control. Therefore, in one or more embodiments, the inventive control mechanism comprises one pedal, button or other control device disposed under the console of the vehicle in a position to be controlled by the left foot of the vehicle's driver. In one or more embodiments, the aforesaid pedal, button or other control device is coupled with one or more systems of the vehicle. In one or more embodiments, the aforesaid coupling is mechanical. In alternative embodiments, the pedal, button or other control device is connected to an electrical actuator switch, which generates an electrical signal used for controlling the corresponding vehicle system or mechanism. In one or more embodiments, two such pedals, buttons or other control devices may be provided for controlling the same of different functions of the vehicle's systems. In one or more embodiments, the pedal, button or other control device is separate and distinct from the break pedal and the gas pedal.

FIG. 1 illustrates an exemplary embodiment of the inventive vehicle control mechanism 100 configured to enable the driver to control one or more systems of the vehicle including, without limitation, the engine, transmission or CVT without causing driver distraction. In the shown embodiment, the inventive control mechanism 100 comprises conventional vehicle control means including, without limitation, break pedal 101 and accelerator pedal 102. These pedals 101 and 102 are commonly operated using the right foot of the driver. In addition to the pedals 101 and 102, the automatic, robotic, or continuously variable transmission of the vehicle may include a handle or other hand-manipulated main control (not shown) of the automatic, robotic, or continuously variable transmission for switching the operation modes of the automatic, robotic, or continuously variable transmission. Exemplary operating modes may include "park" mode, "drive" mode, "neutral mode", etc. In addition to the aforesaid vehicle components, the inventive control mechanism 100 comprises control devices 103 and, optionally, 104. These control devices may be implemented in a form of pedals, buttons, levers, or any other suitable control means. The control devices 103 and 104 are positioned under the console of the vehicle to be easily accessible using driver's left foot. The inventive control devices 103 and 104 are coupled with the vehicle's control system 106 using electrical, mechanical, optical, hydraulic or other suitable coupling 105 designed to transmit the information about the activation of such control device(s) by the driver, or the position of the control device or any other driver control-related information. In one or more embodiments, the inventive coupling 106 may include a processing unit (not shown) and appropriate software for processing signals received from the control devices 103 and 104 and sending appropriate commands to the vehicle's control system 106. In one or more embodiment, the vehicle may also incorporate a conventional ignition system (not shown) controlled by the hands of the driver for starting the engine of the vehicle.

In one or more embodiments, the control devices 103 and 104 are implemented as vehicle pedals. In additional embodiments, the control devices 103 and 104 comprise a pedal, a button or multiple pedals and buttons. In one or more embodiments, the control devices 103 and 104 are configured to control the engine or the transmission of the vehicle providing increased convenience of vehicle control to the driver. In one or more embodiments, the activation of the control devices 103 and 104 by the driver causes the automatic, robotic or CVT transmission of the vehicle to shift gears.

In one or more embodiments, the vehicle is equipped with an additional left foot pedal 103 controlled by the driver. This pedal is coupled with the automatic, robotic or CVT transmission of the vehicle and, upon the driver pressing on this pedal, the inventive vehicle control mechanism is configured to send a command to the automatic, robotic or CVT transmission of the vehicle causing it to perform a gear downshift. In one or more embodiments, the extent of the gear downshift (number of downshifted gears) depends on the depth of pressing of the pedal. On the other hand, then the driver releases the pedal, the inventive vehicle control mechanism is configured to send a command to the automatic, robotic or CVT transmission of the vehicle causing it upshift or to return to the original gear and/or shifting mode.

In one or more embodiments, upon activation, the additional left foot pedal 103 controlled by the driver causes the inventive vehicle control mechanism to send a command to the automatic, robotic or CVT transmission of the vehicle causing it to downshift and/or enter into a sport shifting mode. Upon second activation by the driver, the transmission returns into the normal driving mode. In one or more embodiments, after the first activation, the described pedal is configured to remain in the pressed position and return to the normal position only after the second activation by the driver, whereupon the transmission also returns to the normal shifting mode.

In yet another embodiment, two additional left foot pedals 103 and 104 controlled by the driver are provided. Upon pressing on the pedal 103, the inventive vehicle control mechanism is configured to send a command to the transmission of the vehicle causing it to upshift. On the other hand, upon pressing on the pedal 104, the inventive vehicle control mechanism is configured to send a command to the transmission of the vehicle causing it to downshift.

In one or more embodiments, in addition to the functionality described above, the one or two additional left foot pedals 103 and 104 may be used to control the cruise control module of the vehicle. In one or more embodiments, upon pressing on the pedal 103, the inventive vehicle control mechanism is configured to send a command to the cruise control module of the vehicle causing it to increase cruise speed of the vehicle by a predetermined amount. On the other hand, upon pressing on the pedal 104, the inventive vehicle control mechanism is configured to send a command to the cruise control module of the vehicle causing it to decrease cruise speed of the vehicle by a predetermined amount.

In one or more alternative embodiments, upon pressing on the pedal 103, the inventive vehicle control mechanism is configured to send a command to the cruise control module of the vehicle causing it to set the cruise control speed of the vehicle. On the other hand, upon pressing on the pedal 104, the inventive vehicle control mechanism is configured to send a command to the cruise control module of the vehicle causing it to reset the cruise control speed of the vehicle. It should be noted that in one or more embodiments, the cruise control functions described above may be performed in conjunction with gear shifts.

In yet another embodiment, the one or two additional left foot pedals 103 and/or 104 are provided for controlling drive in a four-wheel drive vehicle. In one or more embodiments, the vehicle is designed to operate in four wheel-drive mode part of the time. In one embodiment, one or more additional left foot pedals 103 and 104 is used for controlling a second drive axel in an all-wheel drive vehicle. Specifically, in one embodiment, one or more additional left foot pedals 103 and/or 104 are used to engage the transfer case of the vehicle to apply the engine power to the second drive axel of the vehicle.

In one embodiment, one of the additional left foot pedals 103 and 104 may be used to engage the transfer case of the vehicle to apply the engine power of the vehicle to the second drive axel of the vehicle to put the vehicle in the four-wheel drive mode. The other of the additional left foot pedals 103 and 104 may be used to disengage the transfer case of the vehicle from applying the engine power to the second drive axel of the vehicle. In various embodiments, the second drive axel of the vehicle controlled by the additional left foot pedals 103 and/or 104 may be the front axel of the vehicle.

In an alternative embodiment, only one pedal, for example the pedal 103 may be used to control application of the power to the second drive axel of the vehicle. In this embodiment, upon first engagement of the pedal, the power is applied to the second drive axel of the vehicle via the transfer case. Upon the second engagement of the pedal, the power is removed from the second drive axel of the vehicle.

In another embodiment, the additional left foot pedals 103 and/or 104 are used for controlling distribution of the rotational momentum between the two axels of the vehicle in the all-wheel vehicle driving mode. This can be accomplished by, for example, by applying a braking power to the wheel attached to one of the two axels of the vehicle. In one or more embodiments, the one or more additional left foot pedals 103 and/or 104 are used to control application of the aforesaid braking power to the affected vehicle wheels. It should be noted that this 4-wheel dive rotational momentum distribution control system is separate and distinct from the conventional braking system of the vehicle, which is usually controlled by the right foot of the vehicle driver. In various embodiments, the additional left foot pedals 103 and/or 104 control the four-wheel drive system of the vehicle through the vehicle's control system 106.

In another embodiment, the additional left foot pedal(s) 103 and/or 104 are used for controlling application of the rotational momentum to at least one axel of the vehicle. In this embodiment, the value or magnitude of the applied rotational momentum is controlled by the driver of the vehicle based on the depth of engagement of the additional pedal(s).

In another embodiment, the rotational momentum applied to at least one axel of the vehicle is controlled using an inter-axel differential with a blocking function. In this embodiment, the additional pedal(s) is(are) used to control application of the blocking function of the inter-axel differential or an extent of application of the blocking function.

In yet another embodiment, the rotational momentum applied to at least one axel of the vehicle is controlled using an inter-axle clutch with a blocking function. In this embodiment, the additional pedal(s) is(are) used to control an application of the blocking function of the inter-axle clutch or an extent of application of the blocking function of the inter-axle clutch.

Finally, it should be finally noted that the vehicle functions described herein may be implemented in either hardware or software.

Although the invention has been shown and described with reference to specific embodiments, it is understood that these embodiments should not be construed as limiting the areas of application of the invention and that any changes and modifications are possible, provided that these changes and modifications do not depart from the scope of the attached patent claims. Thus, compounds mentioned for parts (A) and (B) were given only as examples, and other amino-reactive components, amino-containing components, blowing agents, and additives can be used. The apparatuses for carrying out the method can widely vary provided they are equipped with an intermediate chamber and control of the process optimization parameter.

Moreover, other implementations of the invention will be apparent to those skilled in the art from consideration of the specification and practice of the invention disclosed herein. Various aspects and/or components of the described embodiments may be used singly or in any combination in the systems and methods for controlling a vehicle. It is intended that the specification and examples be considered as exemplary only, with a true scope and spirit of the invention being indicated by the following claims.

What is claimed is:

1. A vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the vehicle further comprising an additional pedal being disposed in the vehicle for control by a left foot of the driver and coupled to the vehicle control system, wherein the additional pedal is separate and distinct from the brake pedal and the gas pedal and wherein the additional pedal is configured to control the gear shifting of the automatic, robotic, or continuously variable transmission of the vehicle separately and distinctly from the control of the automatic, robotic, or continuously variable transmission by means of the handle or other hand-manipulated main control of the automatic, robotic, or continuously variable transmission.

2. The vehicle of claim 1, wherein upon an activation of the additional pedal, the automatic, robotic, or continuously variable transmission of the vehicle is configured to downshift.

3. The vehicle of claim 1, wherein upon a release of the additional pedal, the automatic, robotic, or continuously variable transmission of the vehicle is configured to upshift.

4. The vehicle of claim 1, wherein upon a release of the additional pedal, the automatic, robotic, or continuously variable transmission of the vehicle is configured to return to a previous gear.

5. The vehicle of claim 1, wherein upon an activation of the additional pedal, the automatic, robotic, or continuously variable transmission of the vehicle is configured to upshift.

6. The vehicle of claim 1, wherein the additional pedal is configured to control the gear shifting mode of the automatic, robotic, or continuously variable transmission of the vehicle.

7. The vehicle of claim 6, wherein upon an activation of the additional pedal, the automatic, robotic, or continuously variable transmission of the vehicle is configured to enter sport shifting mode.

8. The vehicle of claim 7, wherein upon a subsequent activation of the additional pedal, the automatic, robotic, or continuously variable transmission of the vehicle is configured to enter a normal shifting mode.

9. The vehicle of claim 1, wherein the additional pedal is configured to control an operating mode of the engine of the vehicle.

10. The vehicle of claim 1, further comprising a second additional pedal coupled to the vehicle control system, the wherein upon an activation of the additional pedal, the automatic, robotic, or continuously variable transmission of the vehicle is configured to downshift and upon an activation of the second additional pedal, the automatic, robotic, or continuously variable transmission of the vehicle is configured to upshift.

11. A method for controlling a vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the method comprising: providing an additional pedal being disposed in the vehicle for control by a left foot of the driver and coupled to the vehicle control system and controlling the vehicle using the additional pedal, wherein the additional pedal is separate and distinct from the brake pedal and the gas pedal and wherein the additional pedal is configured to control the gear shifting of the automatic, robotic, or continuously variable transmission of the vehicle separately and distinctly from the control of the automatic, robotic, or continuously variable transmission by means of the handle or other hand-manipulated main control of the automatic, robotic, or continuously variable transmission.

12. The method of claim 11, wherein the additional pedal is configured to control the gear shifting of the automatic, robotic, or continuously variable transmission of the vehicle.

13. The method of claim 12, wherein upon an activation of the additional pedal, the automatic, robotic, or continuously variable transmission of the vehicle is configured to downshift.

14. The method of claim 12, wherein upon a release of the additional pedal, the automatic, robotic, or continuously variable transmission of the vehicle is configured to upshift.

15. The method of claim 12, wherein upon a release of the additional pedal, the automatic, robotic, or continuously variable transmission of the vehicle is configured to return to a previous gear.

16. The method of claim 12, wherein upon an activation of the additional pedal, the automatic, robotic, or continuously variable transmission of the vehicle is configured to upshift.

17. A vehicle comprising an engine, an automatic, robotic, or continuously variable transmission mechanically coupled to the engine and comprising a handle or other hand-manipulated main control of the automatic, robotic, or continuously variable transmission for switching the operation modes of the automatic, robotic, or continuously variable transmission, a vehicle control system coupled to the engine and the transmission, a braking system, a gas pedal for controlling the operation of the engine, a brake pedal for controlling the operation of the braking system, the gas pedal and the brake pedal being disposed in the vehicle for control by a right foot of the driver, the vehicle further comprising an additional control mechanism being disposed in the vehicle for control by a left foot of the driver and coupled to the vehicle control system, wherein the additional control mechanism is separate and distinct from the brake pedal, the gas pedal and the handle or other hand-manipulated main control of the automatic, robotic, or continuously variable transmission.

18. The vehicle of claim 17, wherein the additional control mechanism is configured to control a cruise control module of the vehicle control system.

19. The vehicle of claim 18, wherein the additional control mechanism is configured to additionally control the gear shifting of the automatic, robotic, or continuously variable transmission of the vehicle.

* * * * *